United States Patent [19]

Yasuda et al.

[11] Patent Number: 5,571,450

[45] Date of Patent: Nov. 5, 1996

[54] FERROELECTRIC LIQUID CRYSTAL COMPOSITION

[75] Inventors: Akio Yasuda; Keiichi Nito, both of Tokyo, Japan

[73] Assignee: Sony Corporation, Tokyo, Japan

[21] Appl. No.: 396,906

[22] Filed: Mar. 1, 1995

Related U.S. Application Data

[63] Continuation of Ser. No. 114,921, Sep. 2, 1993, abandoned.

[30] Foreign Application Priority Data

Sep. 4, 1992 [JP] Japan ..................................... 4-262861

[51] Int. Cl.$^6$ ......................... C09K 19/34; C09K 19/32; C09K 19/12; C09K 19/20
[52] U.S. Cl. ................. 252/299.61; 252/299.62; 252/299.66; 252/299.67
[58] Field of Search ..................... 252/299.66, 299.62, 252/299.67, 299.61

[56] References Cited

U.S. PATENT DOCUMENTS

| | | | |
|---|---|---|---|
| Re. 34,726 | 9/1994 | Wand et al. | 252/299.01 |
| 4,728,458 | 3/1988 | Higuchi et al. | 252/299.65 |
| 4,732,699 | 3/1988 | Higuchi et al. | 252/299.66 |
| 4,911,861 | 3/1990 | Higuchi et al. | 252/299.65 |
| 5,051,506 | 9/1991 | Wand et al. | 544/289 |
| 5,064,569 | 11/1991 | Geelhaar et al. | 252/299.65 |
| 5,100,579 | 3/1992 | Higuchi et al. | 252/299.65 |
| 5,120,468 | 6/1992 | Saito et al. | 252/299.61 |
| 5,130,048 | 7/1992 | Wand et al. | 252/299.01 |
| 5,167,855 | 12/1992 | Wand et al. | 252/299.01 |
| 5,167,863 | 12/1992 | Kitamura et al. | 252/299.65 |
| 5,180,520 | 1/1993 | Wand et al. | 252/299.61 |
| 5,214,523 | 5/1993 | Nito et al. | 359/100 |
| 5,298,188 | 3/1994 | Vergnolle et al. | 252/299.63 |
| 5,380,460 | 1/1995 | Wand et al. | 252/299.6 |

FOREIGN PATENT DOCUMENTS

| | | |
|---|---|---|
| 0178647 | 4/1986 | European Pat. Off. . |
| 0269062 | 6/1988 | European Pat. Off. . |
| 3278993 | 11/1988 | Japan . |
| 1074287 | 3/1989 | Japan . |
| 1074288 | 3/1989 | Japan . |
| 4154769 | 5/1992 | Japan . |
| 4181920 | 6/1992 | Japan . |
| 5017775 | 1/1993 | Japan . |
| 002695 | 1/1995 | Japan . |

OTHER PUBLICATIONS

Article entitled "Liquid Crystals" by Yasuda, Nito and Matsui vol. 14, No. 6 1993.

Primary Examiner—C. H. Kelly
Attorney, Agent, or Firm—Hill, Steadman & Simpson

[57] ABSTRACT

A ferroelectric liquid crystal composition comprises ferroelectric liquid crystal molecules defined by the product between a liquid crystal molecule design parameter, $\alpha$, and an apparent cone angle, $\theta$, of the liquid crystal molecules, $\alpha\theta$, being such that $12.5 \leq \alpha\theta \leq 16$ wherein $\alpha$=(an infrared peak intensity ratio of the alkyl chain portion of a liquid crystal molecule prior to and after switching through an electric field)/(an infrared peak intensity ratio of the core portion of the liquid crystal molecules prior to and after switching through an electric field) and $\theta$ is an apparent cone angle (°) observed from the direction to the substrate normal and the cone has an imaginary circular cone surface when liquid crystal molecules are rotated along the imaginary circular cone surface at the time of switching through an electric field. The composition ensures high speed response and high contrast.

2 Claims, 12 Drawing Sheets

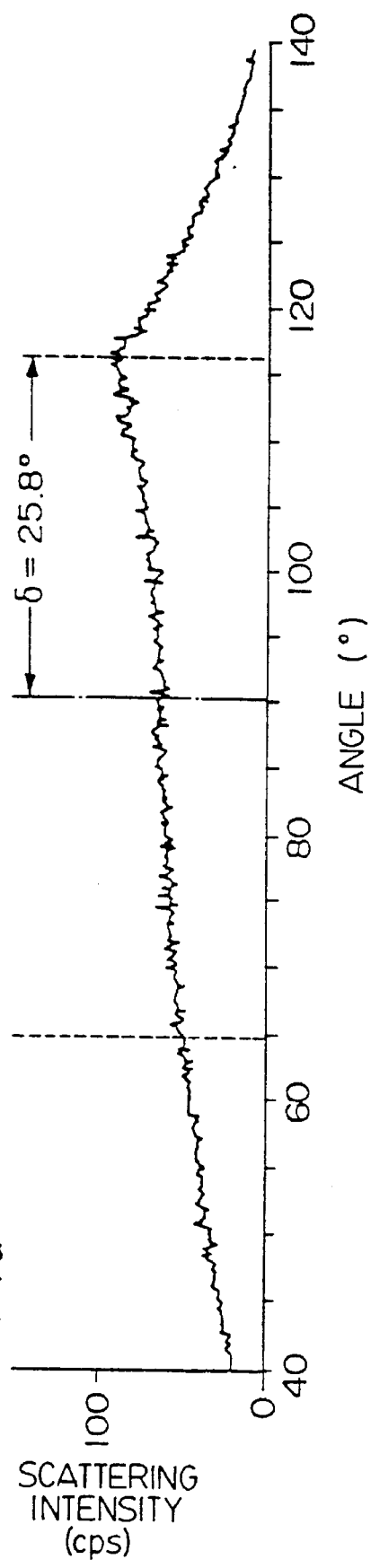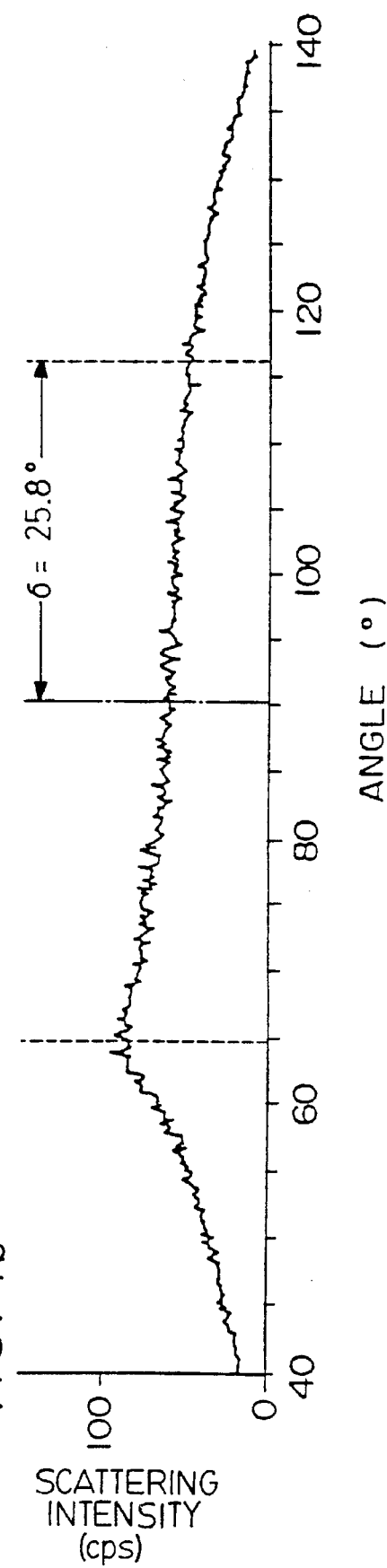

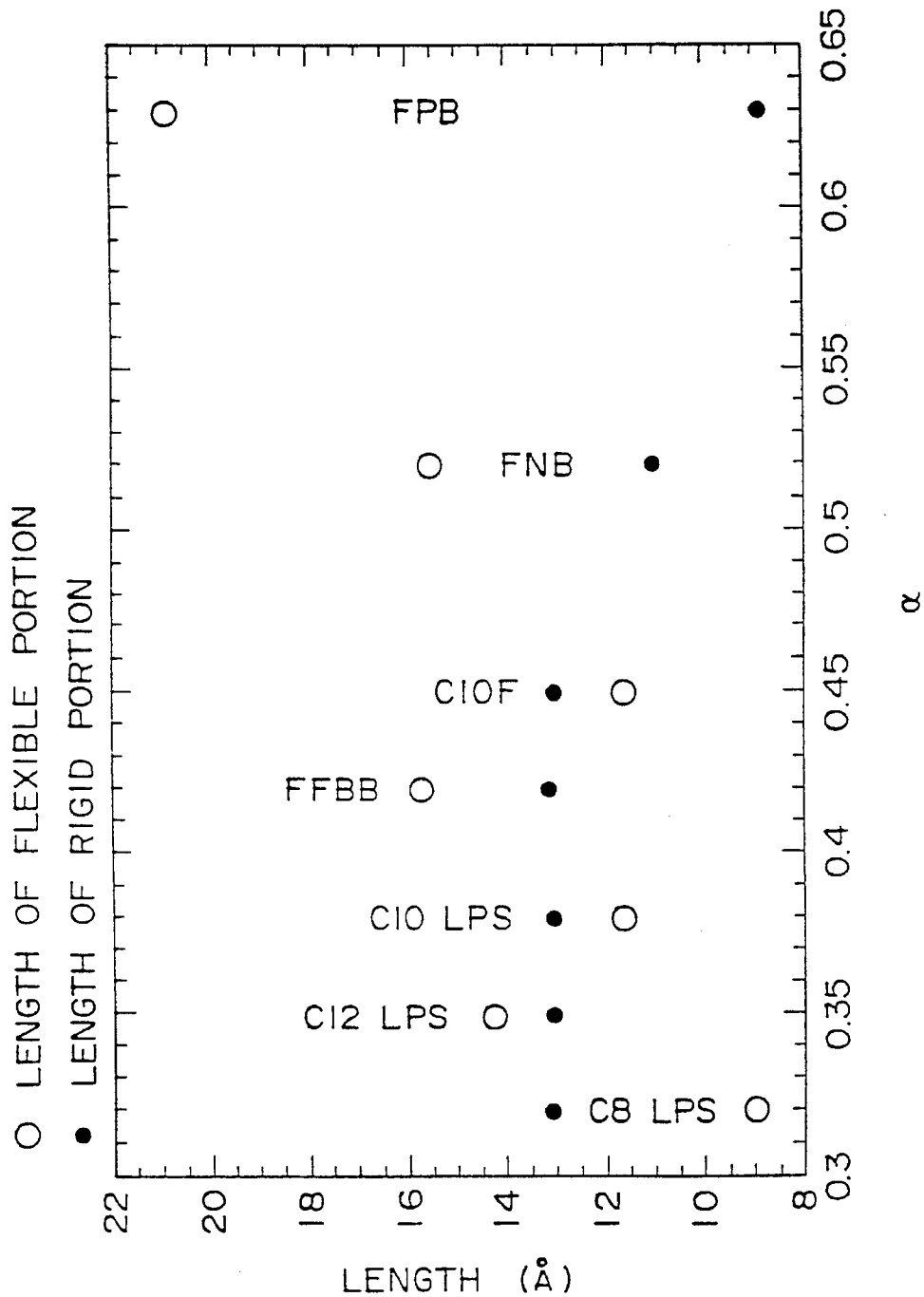

FERROELECTRIC LIQUID CRYSTAL COMPOSITION

This is a continuation of application Ser. No. 08/114,921, filed Sep. 2, 1993 now abandoned.

BACKGROUND OF THE INVENTION

1. Field of The Invention

This invention relates to liquid crystal compositions and more particularly, to ferroelectric liquid crystal compositions which are adapted for use in ferroelectric liquid crystal display devices.

2. Description of The Related Art

In recent years, attention has been paid to ferroelectric liquid crystals (FLC), which make use of the switching effect of chiral smectic C phase (SmC* phase), as a liquid crystal material for use in a variety of liquid crystal display devices.

Such FLC display devices are advantageous in (1) high speed response (greater by 1000 times than that of conventional nematic liquid crystal display devices), (2) wide viewing angle, and (3) image memorizing properties.

A number of ferroelectric liquid crystal molecules have been prepared up to now. Since the response speed, $\tau$, of FLC is expressed according to the following equation, $$\tau = \eta/Ps \cdot E$$

wherein $\eta$ represents a viscosity of material, Ps represents spontaneous polarization, and E represents an electric field, the liquid crystal molecules have been designed so that the spontaneous polarization is made large and the viscosity is made smaller in order to increase the response speed. By this, the value of $\tau$ has been considered to become small.

Although most systems are in conformity with the above equation with respect to the response speed, there arise several problems that when Ps is made larger, an electric field which is induced by liquid molecule's polarization itself directing opposite to an external electric field is generated in the liquid crystal display panel and that the alignment of molecules is disturbed owing to adsorption of impurity ions. This does not result in high speed response as would be expected, with a contrast being not satisfactory. Accordingly, it is a recent trend to set up some questions on the spontaneous polarization being made excessively large.

On the other hand, the following studies have been made on the realization of low viscosity. In order to extend the temperature range, it is usual to use, without use of chiral molecules alone, compositions which comprise mixtures of chiral molecules having the spontaneous polarization as a dopant and non-chiral molecules, as a base material, which are free of spontaneous polarization. In the composition, the base material is made higher in concentration in order to control the viscosity and the extension of the temperature range, so that the viscosity control ordinarily relies on the molecules of the base material. This is a so-called dopant method.

However, the dynamics of the electric field response of FLC are controlled by means of the chiral molecules having the spontaneous polarization. It is of no doubt that what type of chiral molecule is used is an important factor of determining the characteristics of the FLC display device. Accordingly, the emphasis on the control of the viscosity may lead to an adverse influence on the important characteristics of FLC with respect to the composition comprising a major proportion of base molecules.

With respect to the response speed, choice of material has been hitherto based on the above-indicated equation. However, not only some doubts now arise on the manner of the choice, but also any guideline on the contrast of the display has never been proposed.

SUMMARY OF THE INVENTION

It is accordingly an object of the invention to provide a ferroelectric liquid crystal material which exhibit both high speed response and high contrast.

It is another object of the invention to provide a ferroelectric liquid crystal composition which meets a guideline for molecular design for satisfying a requirement for high speed response and high contrast.

We made extensive studies on FLC materials and found that although any parameter which can satisfy requirements for both contrast and response speed has never been known, a new parameter which is a guiding principle for the selection of FLC material is introduced, enabling FLC materials to be selected for high contact and high response speed. The invention is based on this finding.

According to the invention, the above objects can be achieved by a ferroelectric liquid crystal composition which comprises ferroelectric liquid crystal molecules defined by the product between a liquid crystal molecule design parameter, $\alpha$, and an apparent cone angle, $\theta$, of the liquid crystal molecules, $\alpha\theta$, being such that $12.5 \leq \alpha\theta \leq 16$ wherein $\alpha$=(an infrared peak intensity ratio of the alkyl chain moiety of a liquid crystal molecule prior to and after switching through an electric field)/(an infrared peak intensity ratio of the core portion of the liquid crystal molecules prior to and after switching through an electric field) and $\theta$ is an apparent cone angle (°) observed from the direction to the substrate normal and the cone has an imaginary circular cone surface when liquid crystal molecules are rotated along the imaginary circular cone surface at the time of switching through an electric field.

By this, both high speed response and high contrast can be simultaneously realized.

Moreover, there is also provided a ferroelectric liquid crystal composition wherein the product, $\delta$, of the liquid crystal molecule design parameter, $\alpha$, and a ratio of a flexible portion or moiety of a chiral liquid crystal molecule to a rigid portion or moiety of the molecule is such that $\delta \leq 0.5$. The value of $\delta$ is preferably $\delta \leq 0.4$.

Preferably, the ferroelectric liquid crystal composition should comprise chiral smectic ferroelectric liquid crystal molecules which consists essentially of at least one member selected from the group consisting of aromatic compounds having aromatic groups directly bonded together such as biphenyl compounds and aromatic compounds having aromatic groups joined through an ester bond.

BRIEF DESCRIPTION OF THE DRAWINGS

FIG. 4 is an X-ray diffraction spectrum chart of FLC compositions, in the panel 25.8° indicates the smectic layer tilt angle;

FIG. 12 is a graph showing the relation between length of the respective sites of chiral liquid crystal molecules and the value of $\alpha$.

DESCRIPTION OF THE PREFERRED EMBODIMENTS

As stated hereinabove, the ferroelectric liquid crystal composition of the invention is broadly so arranged that the product between a liquid crystal molecule design parameter, $\alpha$, and an apparent cone angle, $\theta$, of the liquid crystal molecules, $\alpha\theta$, is such that $12.5 \leq \alpha\theta \leq 16$ wherein $\alpha$=(an infrared peak intensity ratio of the alkyl chain moiety of a liquid crystal molecule prior to and after switching through an electric field)/(an infrared peak intensity ratio of the core portion of the liquid crystal molecule prior to and after switching through an electric field) and $\theta$ is an apparent cone angle (°) observed from the direction to the substrate normal and the cone has an imaginary circular cone surface when liquid crystal molecules are rotated along the imaginary circular cone surface at the time of switching through an electric field.

The molecule design parameter, $\alpha$, which is a guidance for selection of materials for ferroelectric liquid crystal compositions (which may be hereinafter referred to simply as FLC composition) is first described.

Figure 3:
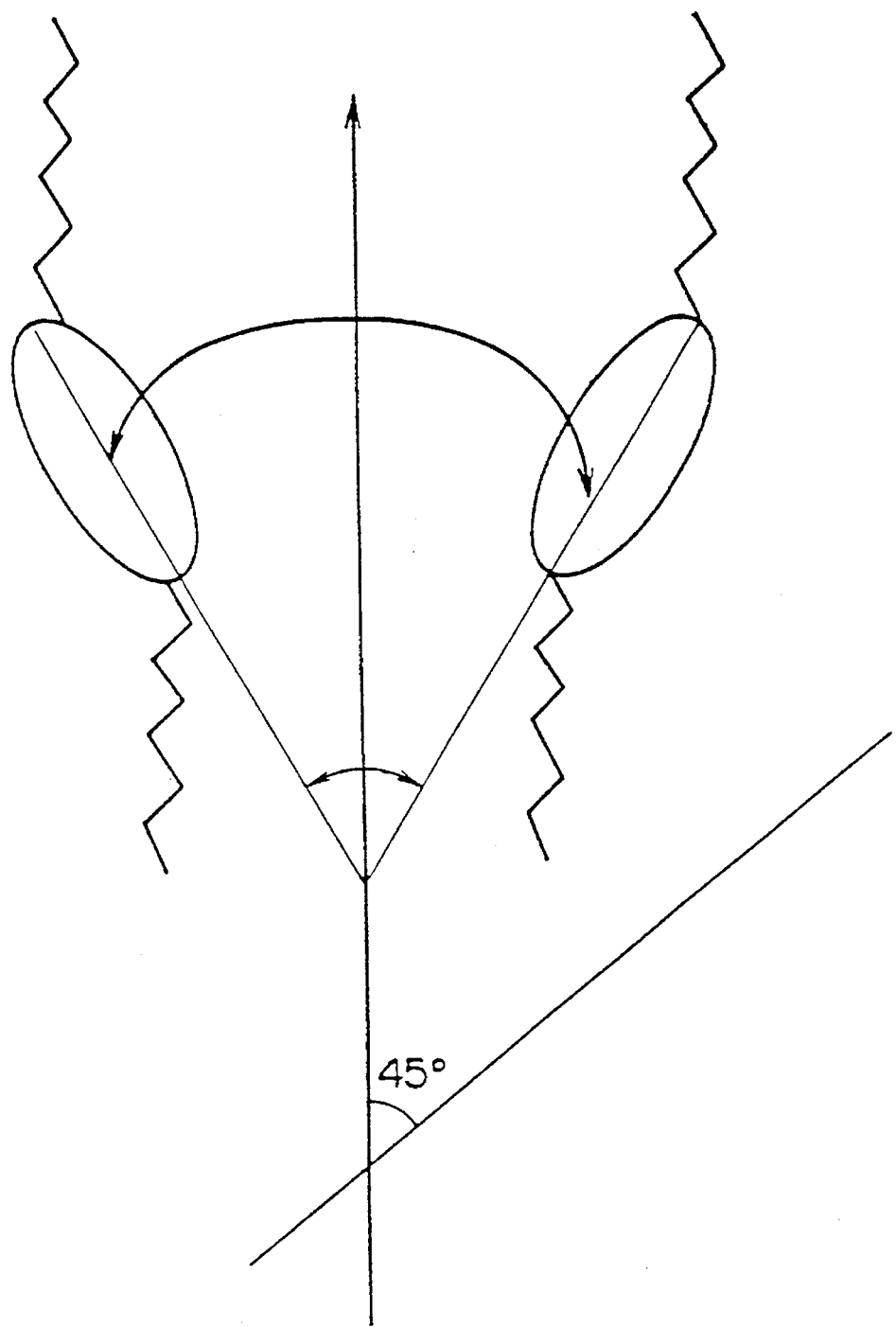
FIG. 3 is an illustrative view showing the behavior of the molecules of FLC.

As shown in FIG. 3, it is considered that, in response to an electric field (usually acting in the direction of from the left to the right as viewed in the figure), the molecules of FLC moves as reversibly rotated in the direction of the arrows along the imaginary cone surface. In general, the liquid crystal molecules are each constituted of a core portion and alkyl chain portions. It is assumed that the core portion and the alkyl chain portions of the liquid crystal molecules which respond to the electric field differ depending on the type of liquid crystal molecule. The above behavior of the movement of the FLC molecules in response to the electric field is considered to result from the spontaneous polarization within the chiral molecules.

In order to elucidate the difference in the behavior between the core portion having a $\pi$ electron system and the alkyl chain portion, it is very effective to use a polarized infrared spectroscopy. In this procedure, a polarizer for IR is placed as inclined at an angle of 45 degree with respect to the direction of aligning treatment. In the polarized infrared spectroscopy, the intensity in the vibration mode of the molecule parallel to the direction of the major axis of the molecule is more strongly observed at a position nearer to the parallel to the polarizer. On the contrary, in the vibration mode of the molecule vertical to the major axis of the molecule, the intensity is more weakly observed when the molecule is arranged more parallel to the polarizer.

When the polarization infrared Spectra are measured prior to and after switching by the action of an electric field, the behaviors of the core portion and the alkyl chain portions of the liquid crystal molecules can be independently evaluated. By determining the ratio between the peak intensity of the monitoring band prior to and after switching by an electric field in the vibration of the molecule of the core portion and the variation rate in the vibration of the molecule of the alkyl chain portion, it will become possible to regulate the movement of the alkyl chains relative to the core portion standardized by the system.

More particularly, $\alpha$ is defined such that $\alpha$=(an infrared peak intensity ratio of the alkyl chain portion of a liquid crystal molecule prior to and after switching through an electric field)/(an infrared peak intensity ratio of the core portion of the liquid crystal molecules prior to and after switching through an electric field).

It is considered that the molecules of the FLC is switched by rotation along the imaginary circular cone surface as shown in FIG. 3. The FLC molecules have a layer structure which is inclined at a certain angle relative to a substrate such as of glass. The molecules are also inclined at a given pre-tilt angle which is regulated by means of an alignment film formed on the substrate. Accordingly, when the angle of the cone (i.e. a vertical angle of the cone) is determined using light passed vertically with respect to the substrate, it is obliquely seen, so that the thus determined angle becomes greater than a real one. In the practice of the invention, the thus observed cone angle which is an apparent cone angle is taken as $\theta$.

According to the invention, the values of $\alpha$ and $\theta$ should satisfy the following relationship:

$$12.5 \leq \alpha\theta \leq 16.$$

Preferably, $13 \leq \alpha\theta \leq 15$. By this, both high speed response and high contrast ratio can be realized. These novel requirements have been found based on the results of extensive experiments and analyses thereof as will become apparent from Examples appearing hereinafter.

The liquid crystal molecules usable in the FLC composition of the invention are now described. Initially, mention is made of chiral molecule species which are shown below, including those compounds abbreviated as C8LPS, C10LPS, C10F, C12LPS, FPB, FFBB and FNB.

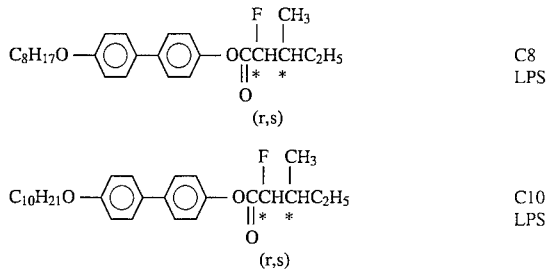

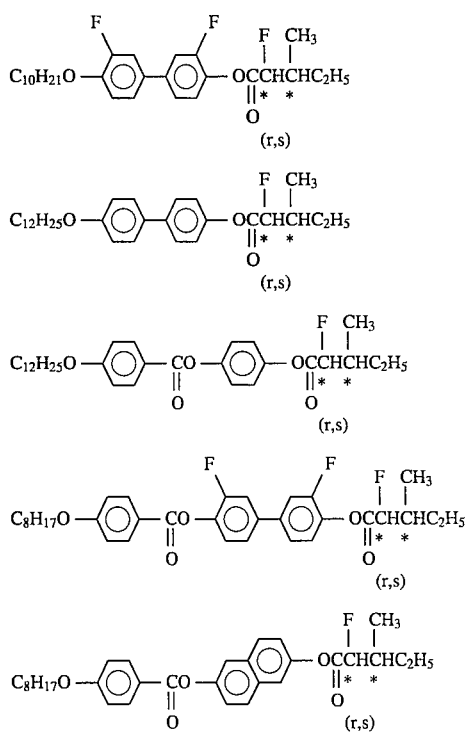

| | |
|---|---|
| (C10F structure) | C10F |
| (C12LPS structure) | C12LPS |
| (FPB structure) | FPB |
| (FFBB structure) | FFBB |
| (FNB structure) | FNB |

Chiral smectic FLC molecules have two asymmetric carbon atoms at one side (at the right side as viewed in the above formulas) of the aromatic atom group of the π electron system from which the core portion is constituted, and a polar group, such as a carbonyl group, capable of producing spontaneous polarization in the molecule. At the other side of the aromatic atomic group, different types of alkoxy groups are bonded.

The FLC molecule consists of an aromatic compound which has aromatic groups directly joined together as will be seen from biphenyl compounds such as C8LPS, C10LPS, C10F, C12LPS and the like, or an aromatic compound of the type which has aromatic groups joined through an ester bond as will be seen from ester compounds such as FPB, FFBB, FNB and the like. In the practice of the invention, both types of compounds may be used singly or in combination. More particularly, at least one type of compound may be used. Other known chiral molecules may be used singly or in combination, if desired.

These usable FLC molecules may be introduced, especially, with a fluorine atom or atoms at the core nucleus to suppress appearance of high-order smectic phases other than smectic A and smectic C phases and to make large spontaneous polarization while taking the position of dipole (e.g. the carbonyl group) into consideration.

On the other hand, in the FLC composition of the invention, non-chiral liquid crystal molecules to be mixed with the FLC molecules may be phenylpyrimidine compounds of the following formulas (1) and (2) shown below

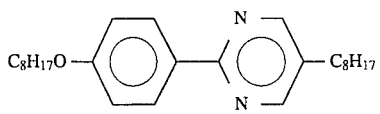

(1)

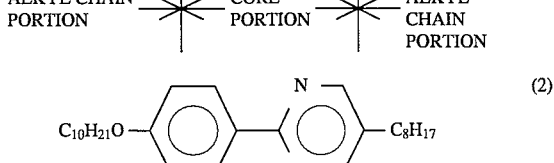

(2)

Besides, phenylpyridine and phenyl benzoate compounds may also be used.

The non-chiral molecule has not asymmetric carbon atom. When such molecules are mixed with chiral molecules, there is obtained a ferroelectric liquid crystal composition having a high speed response. The non-chiral molecule has a core portion consisting of the phenyl group and pyrimidine group and alkyl chain portions bonded at opposite sides.

In the practice of the invention, the chiral molecules are preferably mixed with the non-chiral molecules in the range of from 1 to 50 wt %, more preferably from 2 to 30 wt %, of the total molecules. If the content of the chiral molecules is less than 1 wt %, the spontaneous polarization of the resultant composition becomes so small that the response speed is lowered. On the contrary, when the content exceeds 50 wt %, the range of the working temperature may be undesirably narrowed.

We have made intensive studies on the chiral molecule structure, from which the following results are obtained.

In general, the features of the structure of the chiral molecules reside in that the molecule consists of a rigid core portion having a phenyl group or the like (i.e. a rigid portion) and alkyl chain portions constituted of a flexible alkyl chain (i.e. flexible portions). It was found that the characteristics of the FLC composition are greatly influenced with the core portion and the alkyl chain portions, particularly, by their length.

The lengths of the core portion and the alkyl chain portions of the chiral molecule species indicated hereinbefore are shown below. It will be noted that the core portion and the alkyl chain portion are, respectively, defined as follows.

Core portion (rigid portion):

This portion is primarily composed of an aromatic atomic group and covers a portion ranging from the fluorinated asymmetric carbon atom at one side to an oxygen atom or the carbon atom of the methylene group bonded to the oxygen atom at the other side (with biphenyl compounds) or a carbon atom of the ester bond at the other side (with esters). The length of this portion is indicated as 1 in the following formulas.

Alkyl chain portion (flexible portion):

This portion is primarily composed of an aliphatic group and is an atomic group or group bonded to the core portion, e.g. an alkyl group for biphenyl compounds and a portion ranging from the carbon atom of the ester bond to the end of an alkyl group for ester compounds. The length is indicated as m in the following formulas.

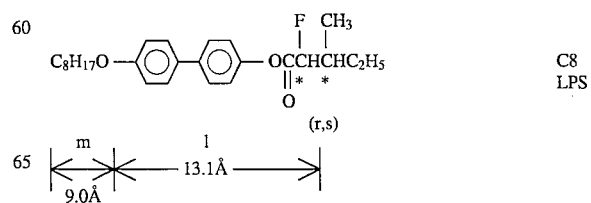

C8LPS

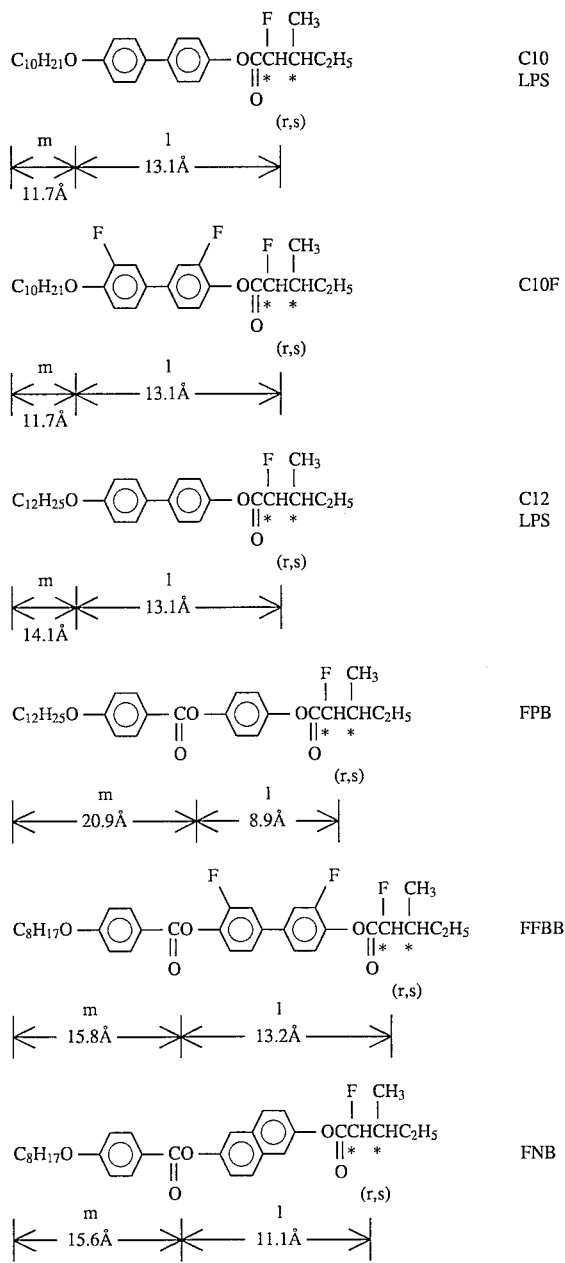

It is considered that the response to an electric field through strong interaction depends on the spontaneous polarization of chiral molecules and non-chiral molecules which are host molecules follow up the movement of the chiral molecules to make a response.

The force of causing the host molecules to follow up the chiral molecules is an intramolecular interaction. It is considered that the degree of the interaction is, most simply, proportional to the magnitude of the overlapping integral in the molecular orbitals. The overlapping integral becomes larger when the degree of the steric overlap of the molecules is larger. Accordingly, it will be seen that the degree of the overlap of the chiral molecules on the host molecules greatly influences the response of the ferroelectric liquid crystal to an electric field.

It is assumed that the rigid portion of the chiral molecule regulates the movement of the rigid portion of the host molecule and the flexible portion of the chiral molecule regulates the movement of the flexible portion of the host molecule.

From this aspect, we have made studies on the design of liquid crystal molecules. As a result, it has been found that when the product, $\delta$, of the liquid crystal molecule design parameter, $\alpha$, and a ratio of the length of the flexible portion of a chiral liquid crystal molecule to the length of the rigid portion, i.e. $\delta = \alpha \cdot$(the length, m, of the flexible portion/the length, l, of the rigid portion), is such that $\delta \leq 0.5$, preferably $\delta \leq 0.4$, both contrast and response speed of the FLC material can be simultaneously improved and can be optimized. Of the flexible portions provided at opposite sides of the rigid portion, a great length or a length of the portion which is free of any asymmetric carbon atom is taken as the length of the flexible portion in the above definition.

The present invention is more particularly described by way of examples.

EXAMPLE 1

(1) Liquid Crystal Materials

The respective chiral molecule species of the formulas indicated hereinbefore and two types of phenyl pyrimidine molecules of the formulas indicated hereinbefore and serving as a base material were mixed to provide mixtures. These mixtures contained 5 wt % of individual chiral molecules and the two phenyl pyrimidine compounds each in an mount of 47.5 wt %.

These systems had such phase series and phase transition temperatures as shown below:

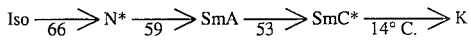

In the phase series of Iso (liquid phase), N* (chiral-nematic), SmA (smectic A), SmC* (chiral smectic) and K (crystals), the temperature range of the SmC* is wider.

(2) Alignment Film

A SiO alignment film was formed Using a known oblique vacuum deposition apparatus (Model EBX-14D, available from ULVAC Inc.). More particularly, a SiO obliquely deposited film was provided as a liquid crystal alignment film. In order to form a book shelf structure, an angle of deposition was set at 85° relative to the normal of the substrate and the thickness was controlled at 600 angstroms with the use of a quartz thickness monitor.

The deposition rate was set at 5 angstroms/second. The panel substrate used was a 1 mm thick ITO electrode-attached plate (cell gap: 2 μm) made of calcium fluoride since it had to allow transmission of infrared light. The book shelf structure was determined by use of X-ray diffraction patterns (tilt angle: 25.8°) shown in FIG. 4. For this purpose, an RU-300 X-ray diffraction apparatus made by Rikagaku Denki Co., Ltd. was used.

(3) Determination of $\alpha$:

Infrared spectra were determined using JIR-6500 FT-IR spectroscope (having a time division function) made by JEOL Co., Ltd. In the examples, switching was effected by application of a rectangular wave of 1 KHz and ±15 V simultaneously with the measurement of a response speed at 40° C.

Since the compositions of the examples had a content of chiral molecules of 5 wt %, infrared spectra which had been measured were mainly composed of a molecular vibration mode of non-chiral phenyl pyrimidine. The band at 1432 cm$^1$ was selected as the molecular vibration mode of the core portion and a mode at 2925 cm$^{-1}$ was selected as the molecular vibration mode of the alkyl chain portion. The ratio of a higher peak value divided by a smaller peak value for the alkyl chain portion to a higher peak value divided by a smaller peak value for the core portion was taken as α.

For the measurement, since it was observed how the variation of the peak high intensity was saturated, the time-divided FT-IR spectroscopic procedure in the order of μ seconds was used. The polarizer of the IR spectroscope was arranged as inclined at 45° relative to the direction of the aligning treatment of the liquid crystal.

Figure 5:
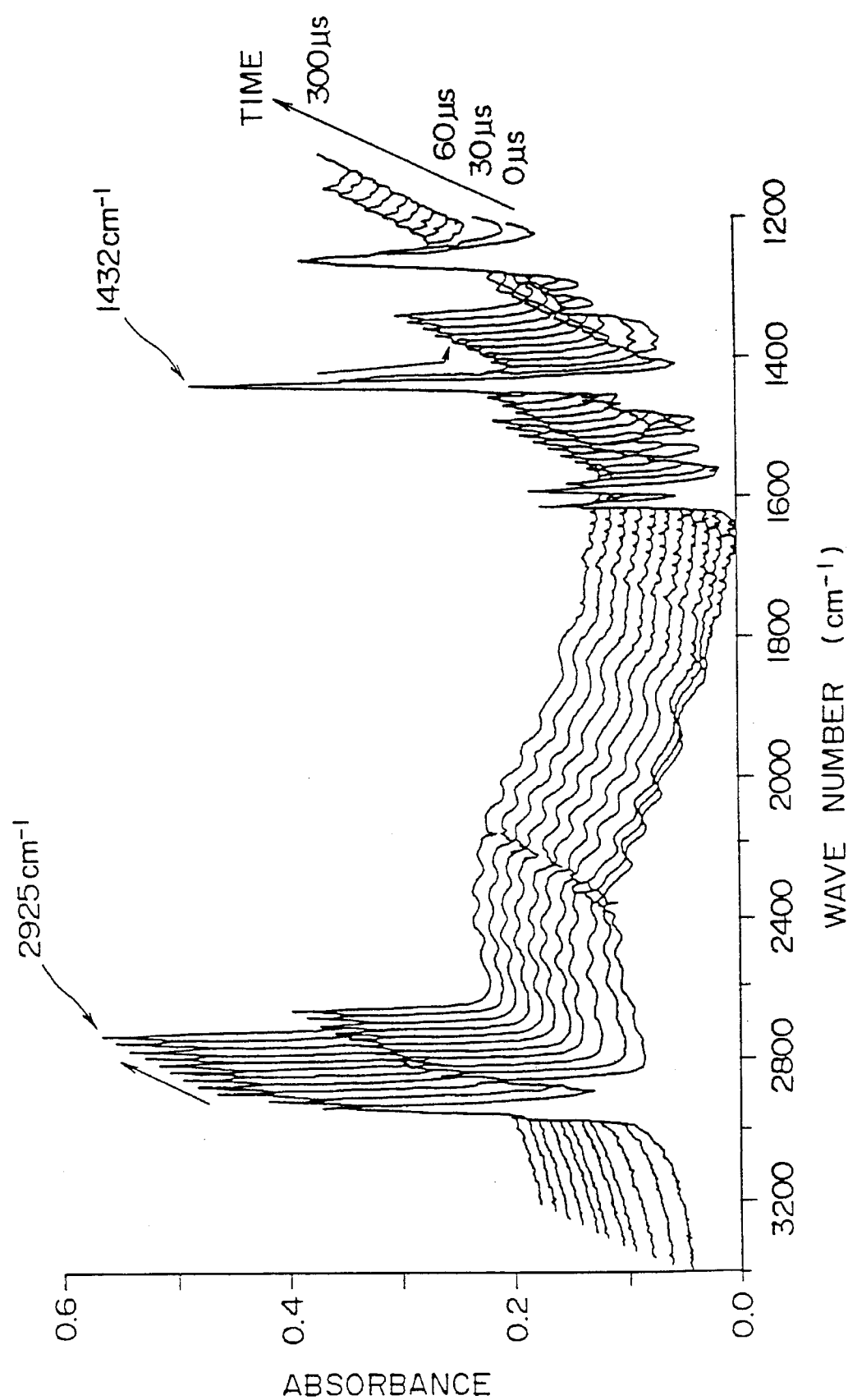
FIG. 5 is a time-resolved FT-IR spectrum chart prior to and after switching of an FLC composition.

In FIG. 5, there are shown the results of the time-resolved FT-IR spectra which were measured at a gate width of 10μ seconds every 30μ seconds with respect to the chiral molecule system comprising C8LPS. The band of the core portion at 1432 cm$^{-1}$ and the band of the alkyl chain portion at 2925 cm$^{-1}$ were, as expected, behaved reversely in the variation of the intensity.

Figure 6:
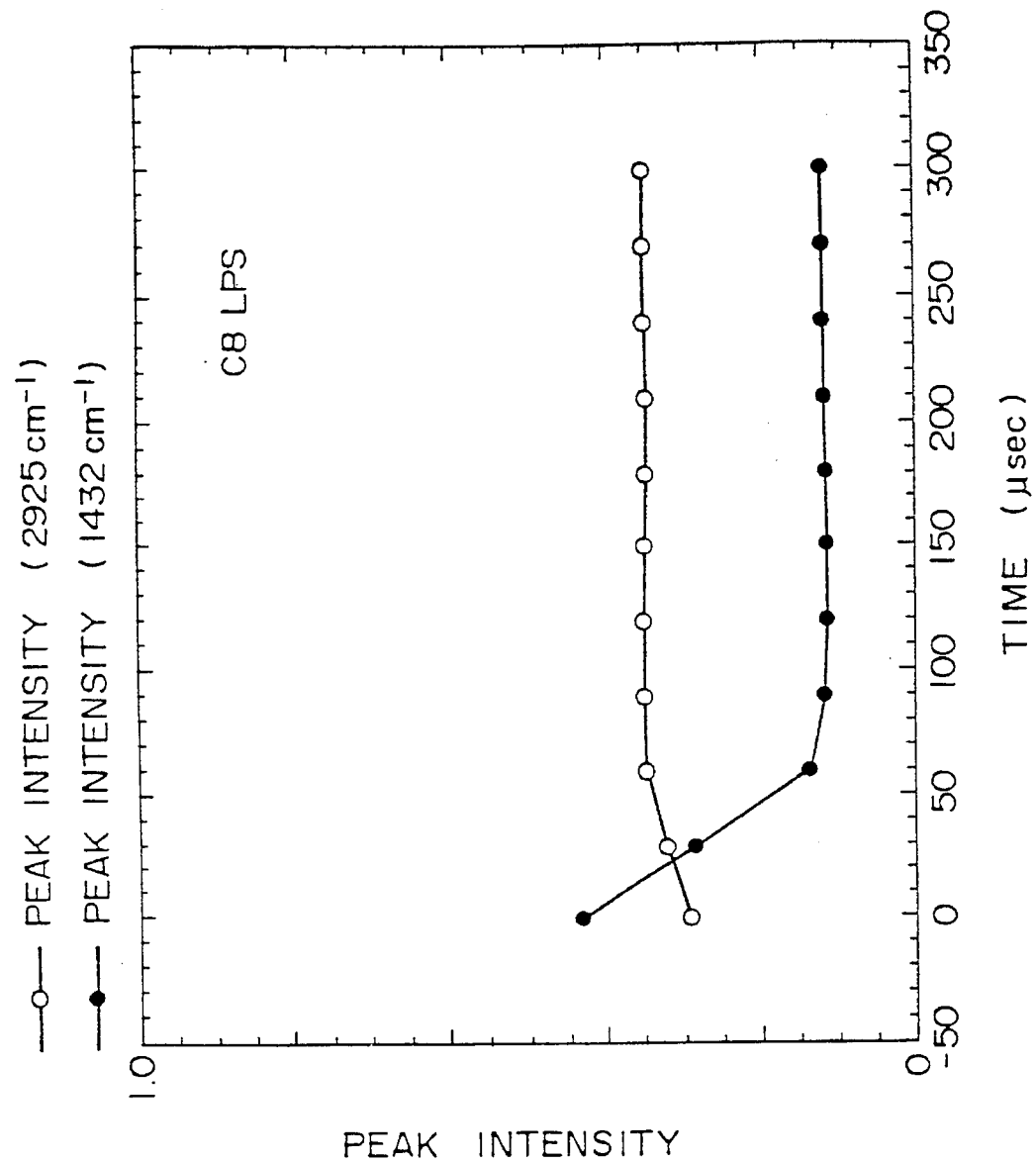
FIG. 6 is a graph showing the relation between the peak intensity of the spectra and the time prior to and after the switching.

The intensity variations of the two bands alone are plotted in FIG. 6. The peak high intensities were taken 300μ seconds after saturation of the variation and at the time of t=0, thereby determining the value of α, α≈0.32. More particularly, $$\alpha = \{0.3476(t = 300 \text{ μs})/0.2946(t = 0)\}/\{0.4334(t = 0)/0.1188(t = 300 \text{ μs})\}$$
$$\approx 0.32.$$

(4) Characteristic Evaluation

Different types of chiral molecules were used to determine a variation in transmittance owing to the electro-optic effect. Under this condition, a time of from commencement of application of the voltage at t=0 (0%) before the variation of the transmittance up to 90% was taken as a response speed (or response time or rise time). The contrast is a ratio between transmittances at voltages +15 V and −15 V. The cone angle is an apparent angle at voltages of +15 V and −15 V, which is determined by rotating the polarizer to measure an extinction position. The results are shown in Table.

TABLE 1

| Chiral Liquid Crystal | Response Time (μs) | Contrast | Cone Angle θ(°) | Value of α | Value of αθ |
|---|---|---|---|---|---|
| FPB* | 128.0 | 19.6 | 20.9 | 0.63 | 13.17 |
| FNB* | 332.0 | 24.6 | 30.8 | 0.52 | 16.02 |
| FFBB* | 422.0 | 23.0 | 40.8 | 0.42 | 17.14 |
| C8LPS | 87.0 | 33.0 | 43.7 | 0.32 | 13.98 |
| C10LPS | 111.0 | 33.6 | 37.8 | 0.38 | 14.36 |
| C12LPS | 118.0 | 29.2 | 42.5 | 0.35 | 14.88 |
| C10F | 132.0 | 28.5 | 28.8 | 0.45 | 12.96 |

*Ester compounds

Figure 7:
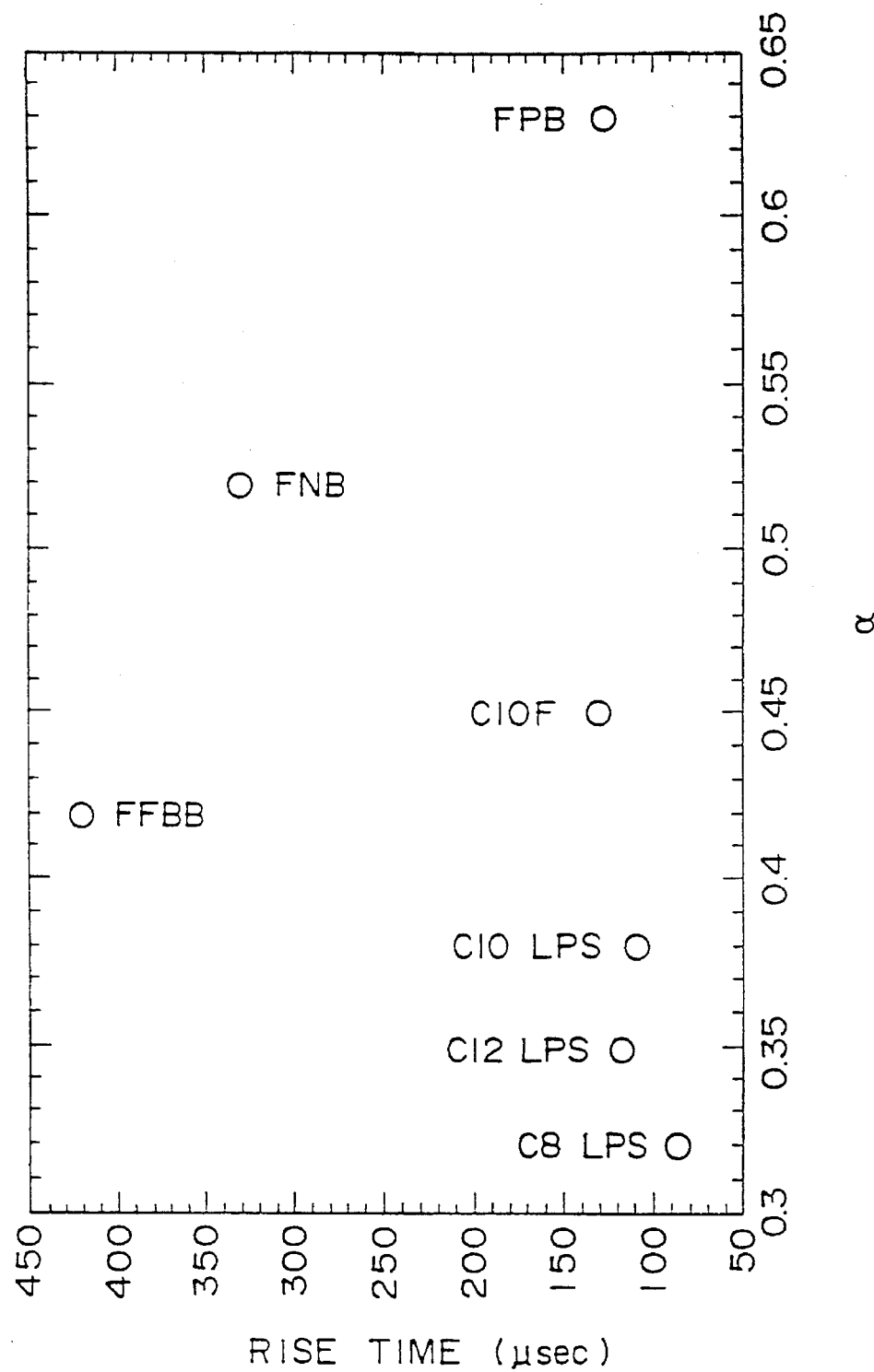
FIG. 7 is a graph showing the relation between the rise time (response speed) and the value of $\alpha$.
Figure 8:
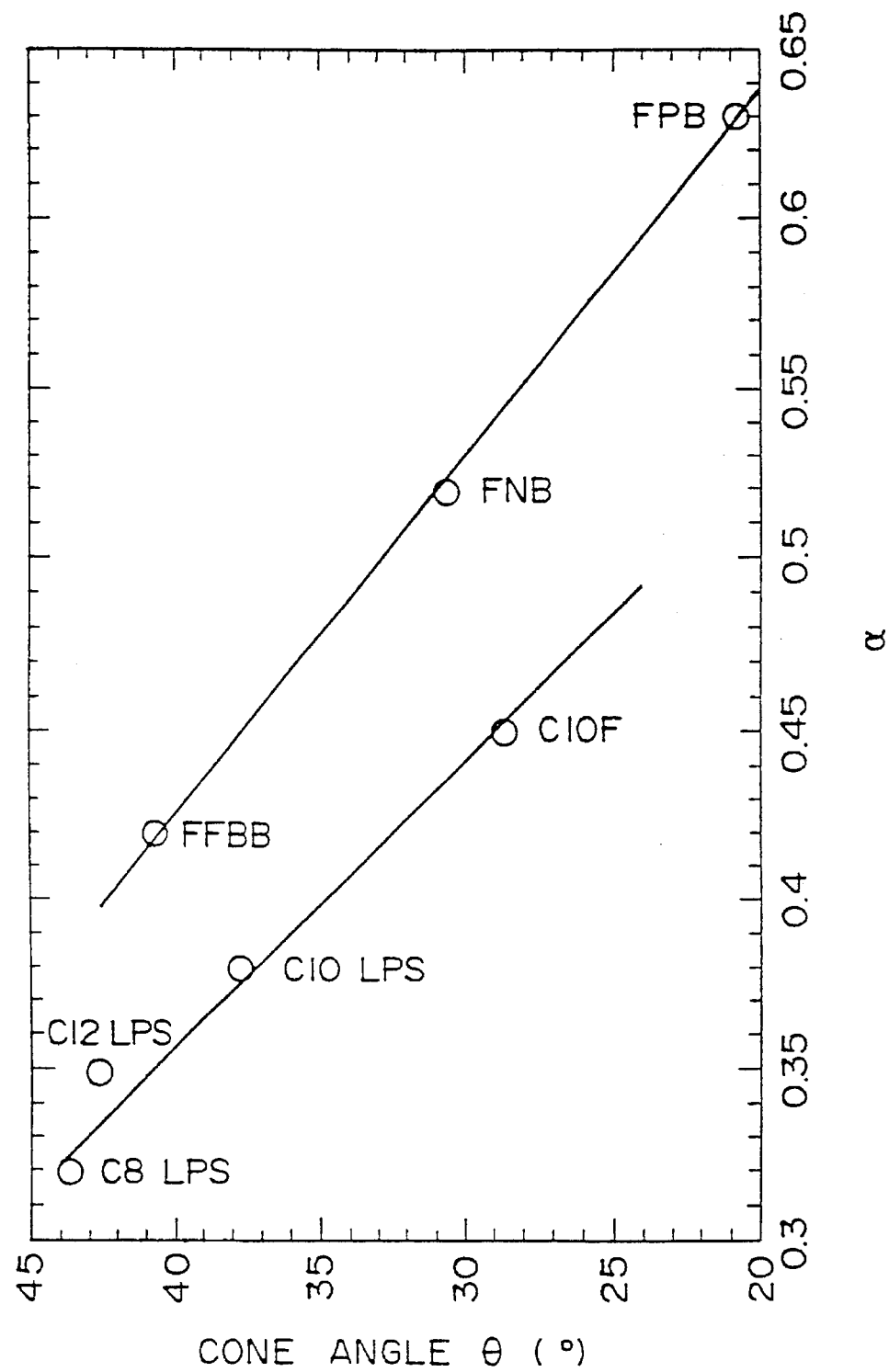
FIG. 8 is a graph showing the relation between the cone angle, $\theta$, and the value of $\alpha$.
Figure 9:
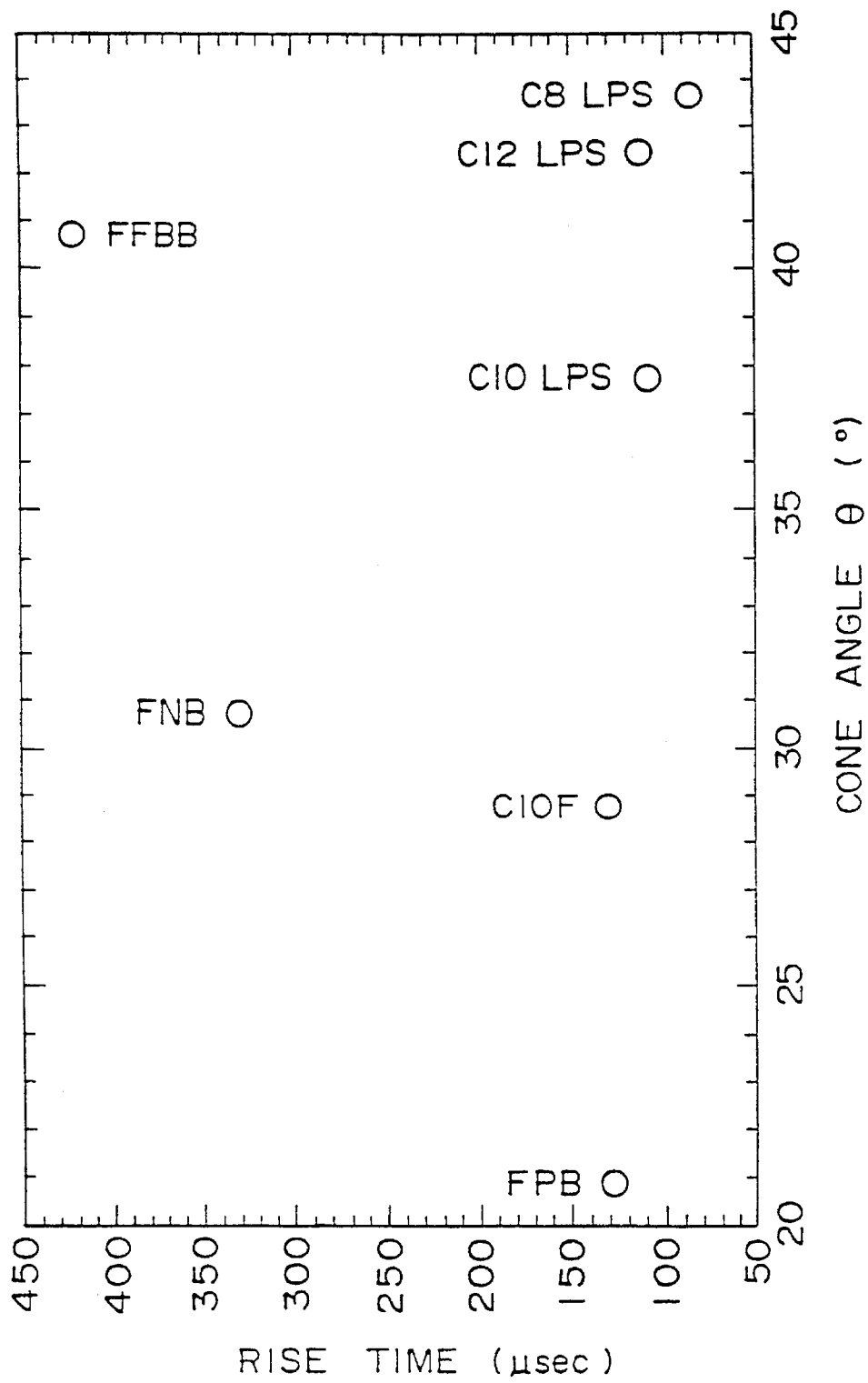
FIG. 9 is a graph showing the relation between the rise time (response speed) and the cone angle, $\theta$.

FIG. 7 shows the relation between the value of α and the response time, FIG. 8 shows the relation between the value of α and the cone angle θ, and FIG. 9 shows the relation between the cone angle θ and the response time.

These results reveal that the respective characteristics vary in a similar manner for the ester compounds (FPB, FNB and FFBB) and for the biphenyl compounds (C8LPS, C10LPS, C12LPS and C10F), respectively. More particularly, the response speed tends to be higher for the biphenyl compounds as will be apparent from FIGS. 7 and 9. The variation in the cone angle of the individual systems relative to the variation in the value of α is substantially linear as will be apparent from FIG. 8.

Figure 1:
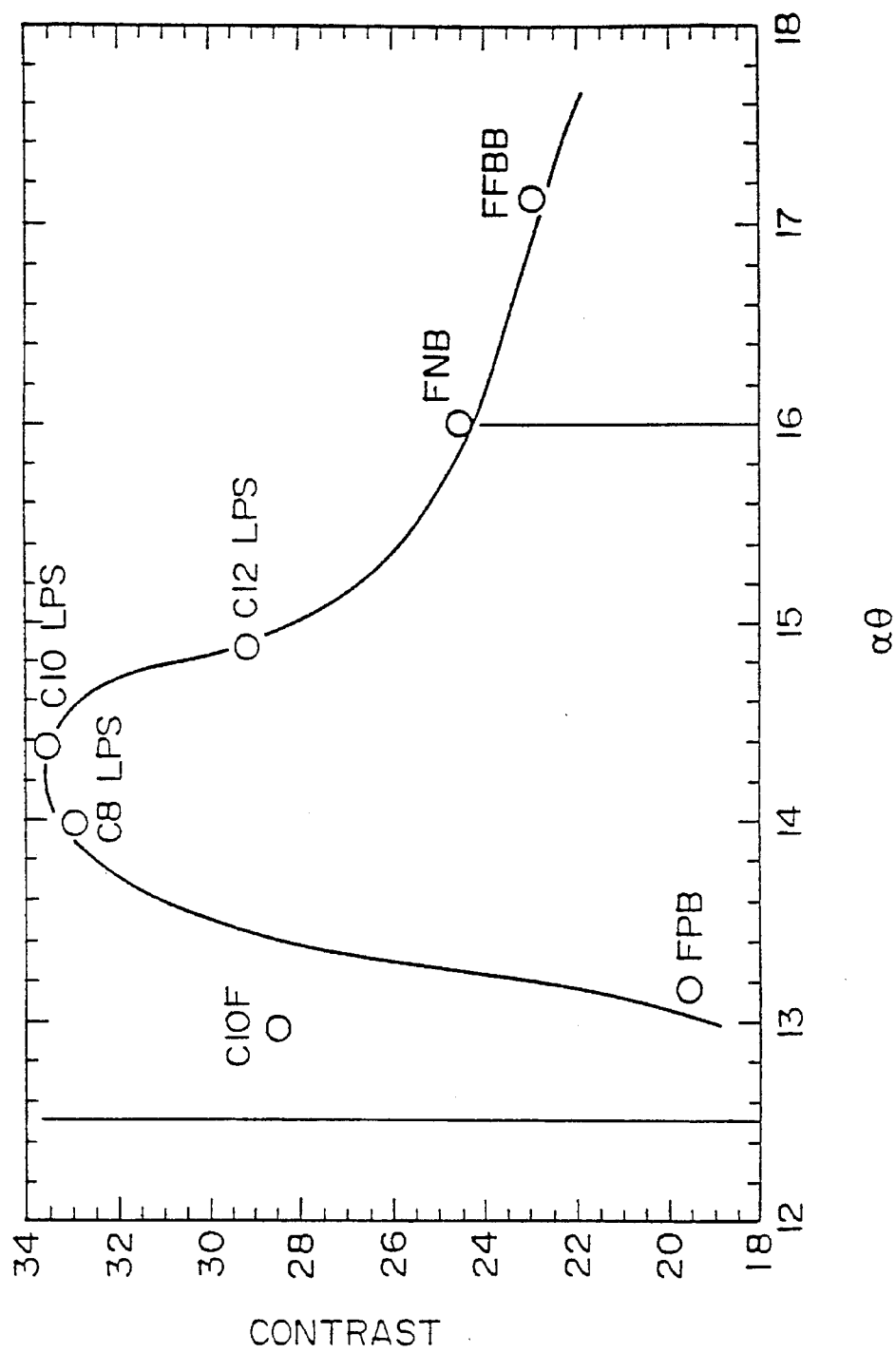
FIG. 1 is a graph showing the relation between the contrast and the product, $\alpha\theta$, where $\alpha$ represents a design parameter of liquid crystal molecules in a ferroelectric liquid crystal (FLC) composition and an apparent angle, $\theta$, of the cone of liquid crystal molecules.
Figure 2:
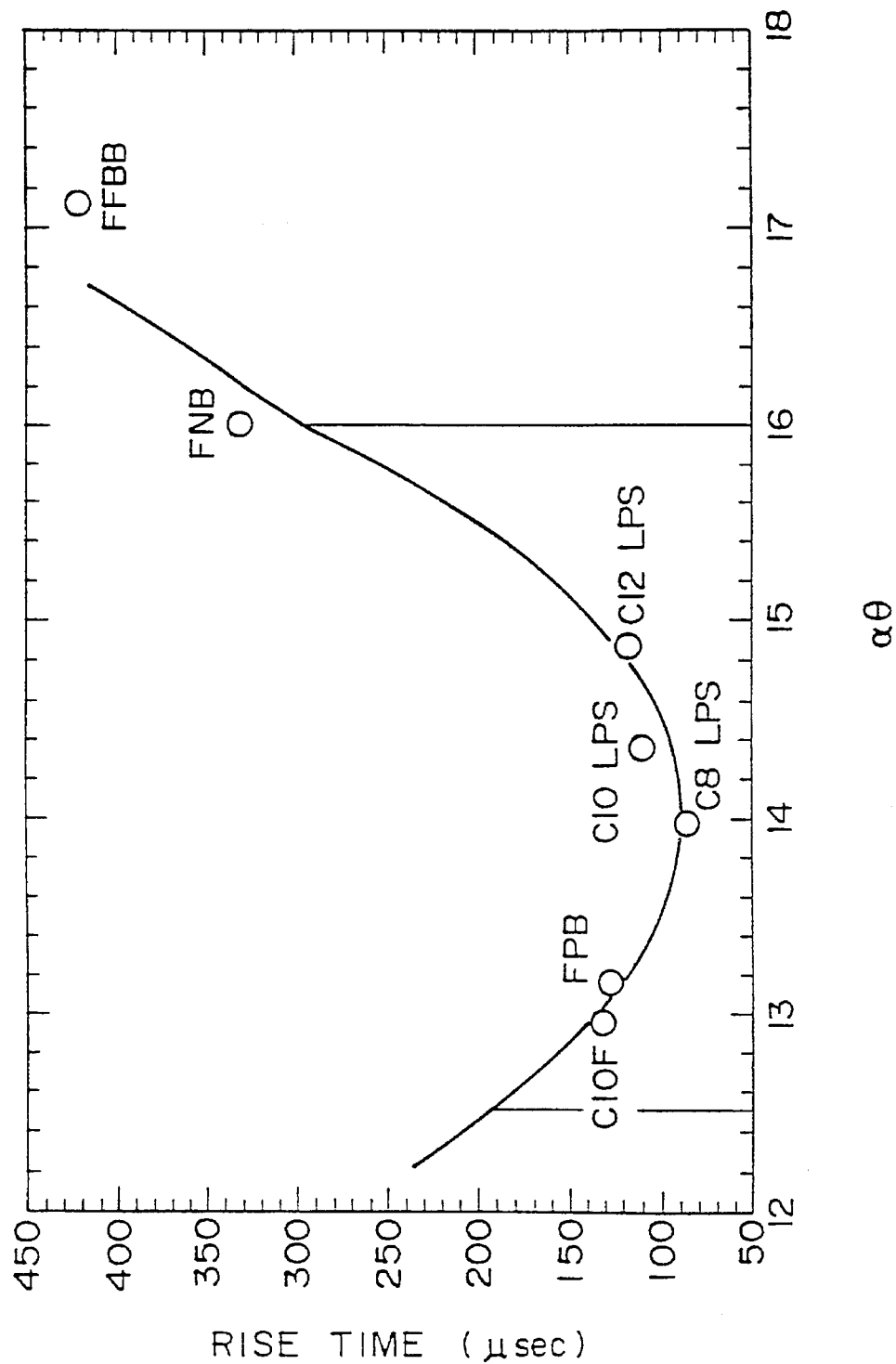
FIG. 2 is a graph showing the relation between the rise time (response speed) and the product, $\alpha\theta$.

In FIGS. 1 and 2, the contrast and the response speed which are fundamental characteristics of display device are, respectively, plotted against the product of the parameter, α, which indicates the behavior of the alkyl chain relative to the core portion, and the apparent cone angle, 74.

According to the results of FIGS. 1 and 2, when the value of αθ is within a range of 12.5≦αθ≦16, both contrast and response speed are significantly improved. Better results are obtained when 13≦αθ≦15. If the value of αθ is less than 12.5 or exceeds 16, both contrast and response speed are considerably worsened.

FIG. 1 indicates a maximum contrast at the value of αθ of approximately 14. The contrast is lowered when the value of αθ is shifted greatly from 14. Accordingly, the range of 12.5≦αθ≦16 is important for realizing a high contrast. FIG. 2 reveals that if the value of αθ is not larger than 16, the response speed becomes less than 350 μs with a maximum speed being at approximately 14.

As will be apparent from the above results, the defined range of the parameter, αθ, is good for both contrast and response speed. Thus, the effectiveness of the parameter will be apparent from this.

EXAMPLE 2

(1) Liquid Crystal Materials

The chiral molecule species of the formulas indicated hereinbefore and two types of phenyl pyrimidine base materials of the formulas (1) and (2) indicated hereinbefore were mixed. More particularly, 5 wt % of each type of chiral molecules and the two types of base materials each used in an mount of 47.5 wt % were mixed to provide a liquid crystal system. These systems had the phase series as shown in Example 1.

The respective chiral molecules were subjected to determination of the lengths of the rigid portion (core portion) and the flexible portion (alkyl portion) thereof by use of the mini-super computer of Alliant FX-2800/SLM/1 wherein the lengths were determined from the molecular structure optimized on MOPAC according to the MNDO method. The lengths of the rigid portion and flexible portion of the respective chiral molecules indicated hereinbefore were determined in this manner.

The alignment film and the determination of the value of α were the same as in (2) and (3) of Example 1.

(4) Evaluation of Characteristics

The response speed and the contrast were determined in the same manner as in Example 1. The characteristics of α×(length of the flexible portion of a chiral molecule/the length of the rigid portion), i.e. δ=α×(m/l), are summarized in Table 2 below along with the response speed and the contrast.

TABLE 2

| Chiral Liquid Crystal | Response Time (μs) | Contrast | Value of α | Value of m/l | Value of δ |
|---|---|---|---|---|---|
| FPB* | 128.0 | 19.6 | 0.63 | 2.35 | 1.48 |
| FNB* | 332.0 | 24.6 | 0.52 | 1.41 | 0.73 |
| FFBB* | 422.0 | 23.0 | 0.42 | 1.20 | 0.50 |
| C8LPS | 87.0 | 33.0 | 0.32 | 0.69 | 0.22 |
| C10LPS | 111.0 | 33.6 | 0.38 | 0.89 | 0.34 |
| C12LPS | 118.0 | 29.2 | 0.35 | 1.08 | 0.38 |
| C10F | 132.0 | 28.5 | 0.458 | 0.89 | 0.40 |

*Ester compounds

Figure 10:
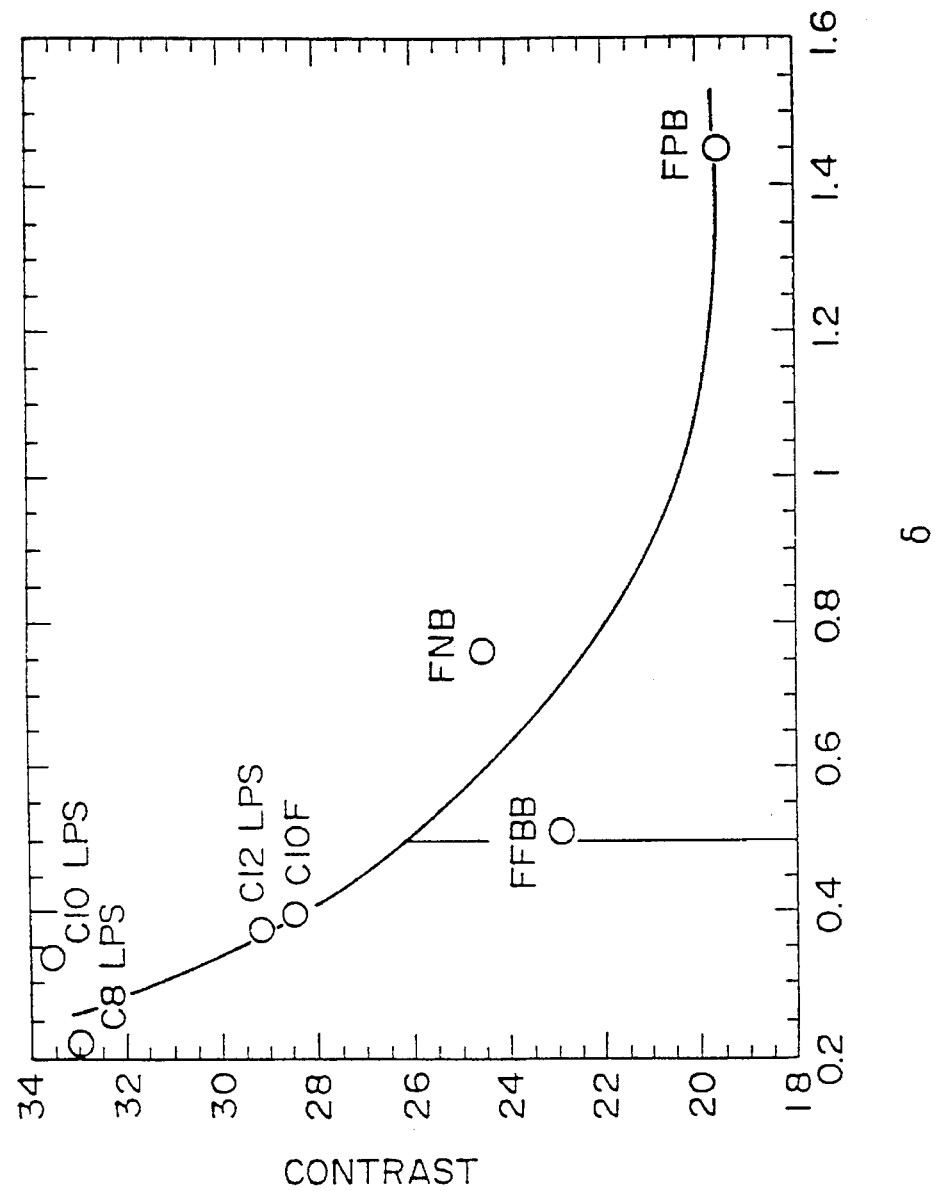
FIG. 10 is a graph showing the relation between the contrast and the product, $\delta$, of the value of $\alpha$ and the value of (the length of a flexible moiety/the length of a rigid moiety) of chiral liquid crystal molecules.
Figure 11:
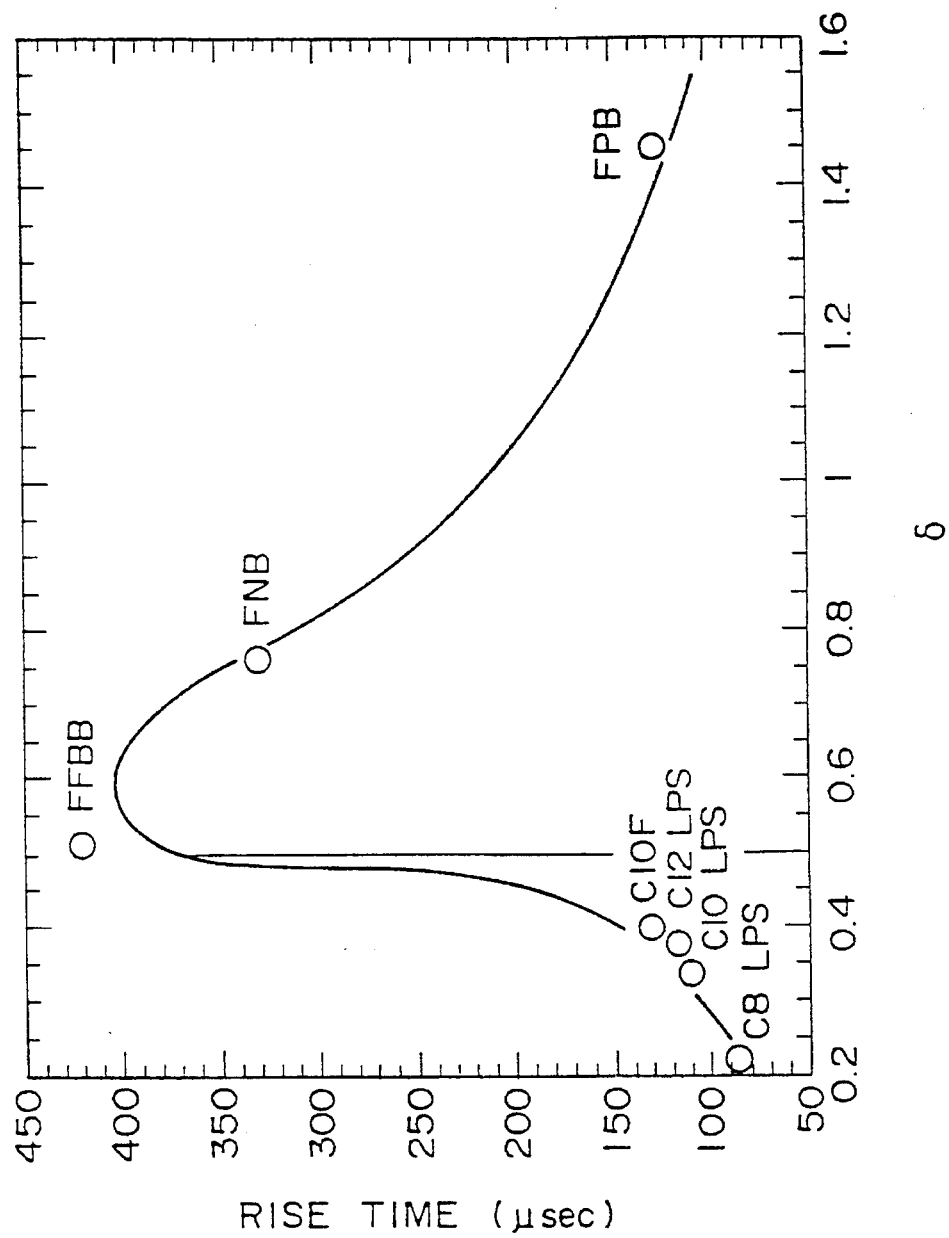
FIG. 11 is a graph showing the relation between the rise time and the product, $\delta$.

The contrast and rise time are, respectively, plotted against the value of δ as shown in FIGS. 10 and 11. As will be seen from FIG. 10, the contrast tends to increase as the value of δ is decreased. The contrast is 20 or over when the value of δ is smaller than 1. However, FIG. 11 reveals that the response time becomes maximum in the vicinity of the value of δ of 0.6, at which the time becomes the slowest.

In order to make a response speed of not larger than 20 μs, the value of δ should be not larger than 0.5 or not smaller than 1. In view of the requirement for the contrast, a range of δ of not less than 1 is not suitable. Accordingly, the value of δ should be not larger than 0.5, preferably not larger than 0.4, defined in the present invention. Within this range, both high contrast and high response speed can be realized.

In FIG. 12, there is shown the relation between the value of α and the lengths, m and l of the chiral molecules. Within in a range of $\alpha \geq 0.45$, the value of α increases with an increase of the length, m, of the flexible portion and decreases with an increase of the length, l, of the rigid portion. Thus, the value of α can be controlled by controlling the lengths of m and/or l. Especially, the length, m, of the flexible portion is important for the liquid crystal system.

With biphenyl compounds, when the length, m, of the flexible portion is small or the value of α is small, both contrast and response speed are improved. In a range of $\delta \leq 0.5$, the improving effect becomes pronounced. With the ester compounds, the influence of the length of the flexible portion is not clear. In view of the fact that when the value of α is increased, the response speed becomes high with the cone angle being small, it is assumed that a great length of the flexible portion results in a small cone angle and the high response speed relies on a short rigid portion.

Further variations and modifications may be made within the scope of the present invention.

For instance, the value of αθ is defined such that $13.5 \leq \alpha\theta \leq 15$. Alternatively, a smaller value of δ may be used. To this end, types and compositions of chiral molecules and non-chiral molecules may differ from those specified in these examples.

As a matter of course, biphenyl and ester compounds may be used in combination as chiral molecules.

The FLC composition of the invention is suitable for use in high speed optical shutters capable of high speed response and high density display and display devices for a great quantity of display information. Moreover, the composition is promising for use in optoelectronic devices such as space optic modulators utilizing ferroelectric liquid crystal elements and image-processing devices.

What is claimed is:

1. A ferroelectric liquid crystal composition which comprises a mixture of chiral smectic ferroelectric liquid crystal molecules and non-chiral liquid crystal molecules defined by the product between a liquid crystal molecule design parameter, α, and an apparent cone angle, θ, of the liquid crystal molecules, α, θ, being such that $12.5 \leq \alpha\theta \leq 16$ wherein α=(an infrared peak intensity ratio of the alkyl chain portion of a liquid crystal molecule prior to and after switching through an electric field)/(an infrared peak intensity ratio of the core portion of the liquid crystal molecules prior to and after switching through an electric field) and θ is a cone angle (°) observed from the direction to the substrate normal and the cone has a circular cone surface when liquid crystal molecules are rotated along the circular cone surface at the time of switching through an electric field and wherein said liquid chiral smectic crystal molecules are selected from the group consisting of

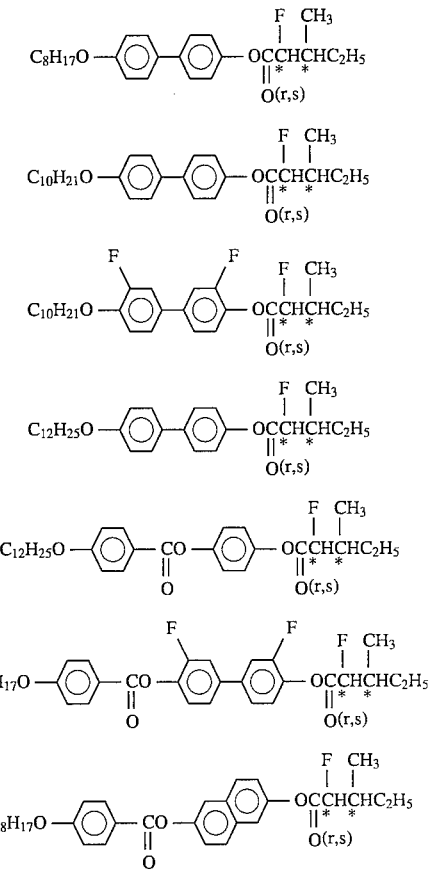

and the non-chiral liquid crystal molecules are selected from the group consisting of:

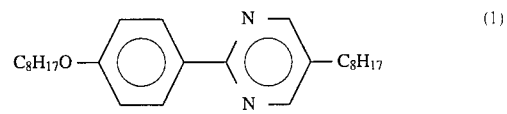

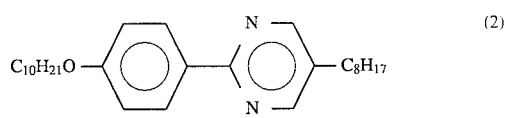

wherein $12.5 \leq \alpha\theta \leq 16$, wherein a product, δ, of the liquid crystal molecule design parameter, α, and a ratio of a length of a flexible portion of the liquid crystal molecules to a length of a rigid portion of the liquid crystal molecules is such that $\delta \leq 0.5$, and wherein said chiral smectic ferroelectric liquid crystal molecules are present in an amount of from 1 to 50 wt % based on said composition.

2. A ferroelectric liquid crystal composition according to claim 1, wherein $\delta \leq 0.4$.

* * * * *